United States Patent
Shanmugavadivel et al.

(10) Patent No.: US 10,075,361 B2
(45) Date of Patent: Sep. 11, 2018

(54) SELF-TESTING OF SERVICES IN AN ACCESS POINT OF A COMMUNICATION NETWORK

(75) Inventors: Senthilraj Shanmugavadivel, Tamilnadu (IN); Anil Kaushik, Karnataka (IN); Raj Kiran, Karnataka (IN)

(73) Assignee: Extreme Networks, Inc., San Jose, CA (US)

( * ) Notice: Subject to any disclaimer, the term of this patent is extended or adjusted under 35 U.S.C. 154(b) by 1289 days.

(21) Appl. No.: 13/184,142

(22) Filed: Jul. 15, 2011

(65) Prior Publication Data
US 2013/0016618 A1    Jan. 17, 2013

(51) Int. Cl.
H04L 12/26    (2006.01)
H04W 24/06    (2009.01)

(52) U.S. Cl.
CPC ............ *H04L 43/50* (2013.01); *H04L 43/10* (2013.01); *H04W 24/06* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 7,539,489 B1* | 5/2009 | Alexander | 455/423 |
| 7,826,381 B1* | 11/2010 | Kastuar | H04L 12/4641 370/242 |
| 8,145,136 B1* | 3/2012 | Bharghavan | H04W 24/06 379/1.01 |
| 2003/0142629 A1* | 7/2003 | Krishnamurthi et al. | 370/249 |
| 2006/0205398 A1* | 9/2006 | Seckendorf et al. | 455/423 |
| 2008/0020746 A1* | 1/2008 | Alexandar | H04W 24/06 455/423 |
| 2008/0103738 A1* | 5/2008 | Chandrashekar et al. | 703/6 |
| 2008/0293402 A1* | 11/2008 | Rajan et al. | 455/425 |
| 2011/0131452 A1* | 6/2011 | Kumar | G06F 11/2242 714/34 |
| 2011/0222414 A1* | 9/2011 | Borsos et al. | 370/248 |
| 2011/0257923 A1* | 10/2011 | Boulton | G01S 5/0221 702/117 |
| 2012/0137185 A1* | 5/2012 | Venkataramanan | G11C 29/26 714/718 |

* cited by examiner

*Primary Examiner* — Michael J Moore, Jr.

(74) *Attorney, Agent, or Firm* — Haley Guiliano LLP

(57) ABSTRACT

A technique for self-testing of services in an access point of a communication network includes providing a table that has a mapping between a service test, packets to be sent for testing, and packets that should be received in response to the testing, emulating and marking the test packets to be sent, placing the marked test packets in an Rx queue, processing the test packets normally by the access point to provide response packets and marking these response packets, delivering the marked response packets to a Rx queue, retrieving the marked response packets from the Rx queue, and comparing the service test response packets to the list of packets that should have been received in the response to the testing in order to validate that service on the access point.

14 Claims, 2 Drawing Sheets

SELF-TESTING OF SERVICES IN AN ACCESS POINT OF A COMMUNICATION NETWORK

FIELD OF THE DISCLOSURE

The present invention relates generally to wireless communication networks and more particularly to self-testing of services in an access point of a communication network.

BACKGROUND

Wireless local-area networks (WLAN), such as IEEE 802.11 wireless communication networks, are growing in popularity. Such networks are becoming the de facto wireless networking protocol provided by most corporations and network vendors. As a result, such wireless communication networks now support many critical services, which need high availability assurance in the network. Therefore, it has become crucial to ensure that the access points are always available to provide these services.

An access point needs to make various services available for it function it properly. These services can operate within the network internally or externally to the access point. Examples of these services are Dynamic Host Configuration Protocol, Domain Name System, etc. However, it is difficult to check the availability of these services at all times, and there is no technique available which can make sure that services are working properly without wasting network resources.

Therefore, what is needed is a technique for an access point to self-test itself for service assurance. It would be of benefit if this can be accomplished with minimum wasting of air-time or resources in the communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
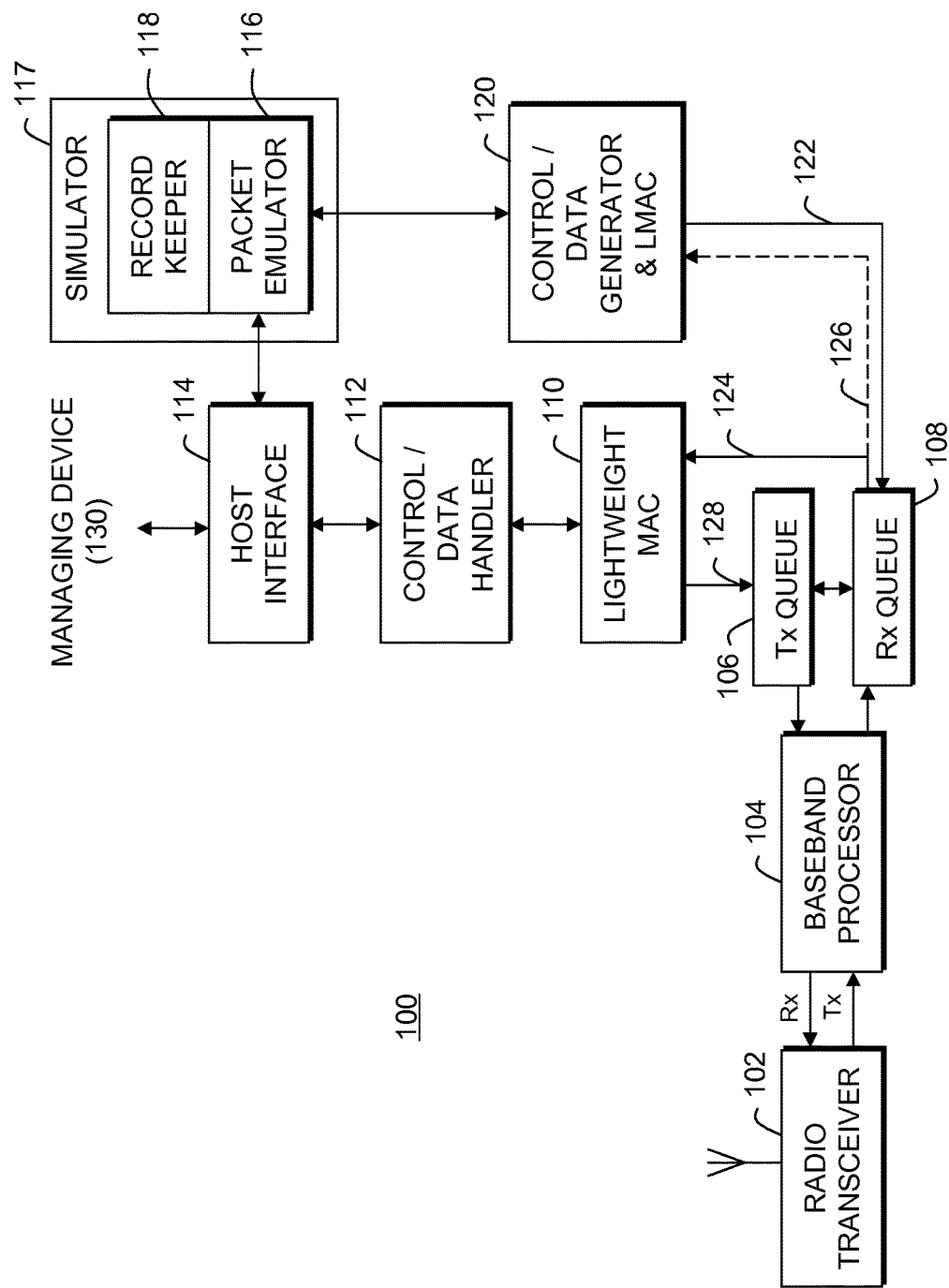
FIG. 1 is a simplified block diagram of an access point of a wireless communication network, in accordance with one embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a technique for an access point to self-test itself for service assurance. This is accomplished with minimum waste of air-time or resources in the communication network. For example, an access point could conduct control or management service tests internally without consuming any air time. The access point can also provide an indication if a problem is found with any services.

FIG. 1 is a block diagram depiction of an access point (AP) 100 of a wireless communication network, such as an IEEE 802.11 wireless local-area communication network (WLAN). However, it should be recognized that the present invention is also applicable to other wireless communication systems. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for such wireless telecommunications systems. The communication system represents a system operable in a network that may be based on different wireless technologies. For example, the description that follows can apply to an access network that is IEEE 802.xx-based, employing wireless technologies such as IEEE's 802.11, 802.16, or 802.20, modified to implement embodiments of the present invention.

The AP 100 of FIG. 1 is adapted to support the inventive concepts of the embodiments of the present invention. Those skilled in the art will recognize that FIG. 1 does not depict all of the network equipment necessary for system to operate but only those system components and logical entities particularly relevant to the description of embodiments herein. For example, an access point, eNodeB, or base station can be connected with or comprise one or more devices such as wireless area network stations (which include access nodes, Media Access Controllers (MAC), AP controllers, and/or switches), base transceiver stations, base site controllers, packet control functions, packet control units, and/or radio network controllers. However, none of these other devices are specifically shown in FIG. 1.

AP 100 is depicted as comprising a radio transceiver 102, baseband processor 104, a transmitter queue 106, a receiver queue 108, a (lightweight) Media Access Control processor 110, a control/data handler 112, a host interface 114, a simulator 117 (including a packet emulator 116 and record keeper 118), and a control/data generator and (lightweight) Media Access Control (LMAC) processor 120. In general, components such as processors, handlers, and transceivers are well-known. For example, the transceiver 102 is operable to communicate with user devices over an IEEE 802.11 interface. In addition, AP processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement an AP processor that performs the given logic. Therefore, AP 100 represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the AP aspect of the present invention may be implemented in any of the devices listed above or distributed across such components. It is within the contemplation of the invention that the operating requirements of the present invention can be implemented in software, firmware or hardware, with the function being implemented in a software processor (or a digital signal processor) being merely a preferred option.

Referring back to FIG. 1, the present invention introduces new entities including a simulator 117, which can include a packet emulator 116 and a record keeper 118, and a control/data generator and (lightweight) Media Access Control module 120. Although these are shown as multiple separate modules, it should be recognized that these functions could be incorporated into one module or even into existing modules or processors of the access point 100. These new entities are used to test the availability of services in the access point. When a test is triggered in the access point, the new entities can mock the required packets in the data queues necessary to test the service internally, without using the air interface. The triggering of the test can be done manually (on demand) or automatically, such as a test that can be scheduled to run periodically or a trigger based on a performance threshold, e.g. more than X number of mobile stations getting timed out, etc. The actual trigger can originate from within the access point or externally to the access point from a network managing device 130, such as a wireless switch of the network, a server, or a cloud controller.

The simulator 117 includes a pre-stored table which has a mapping between a service test, a list of a sequence of packets to be sent for testing that service, and a list of a sequence of packets that should be received in response to the testing, in accordance with the present invention. One example of a service test could be named "Association test", which can be mapped to the list of packets: Probe Request, Authorization Request, Association Request, and Data packet. Upon receiving a trigger for a specific service test, the simulator 117 will look up the specified test in the table and obtain the mapped list of packets to be used in the service test. Each service test could also have a set of instructions to be executed for testing. The packet emulator 116 can then emulate (create) the actual packets to be used for the service test. The packets are then supplied to a control/data generator and LMAC mock-up module 120. This module provides similar functionality as the existing LMAC 110 and control/data handler 112 modules of the access point, but with an additional marking function, in accordance with the present invention. The mock-up module 120 adds the necessary IEEE 802.11 physical (PHY) layer and MAC layer headers to the packets (i.e. encapsulating the packets), marks the packets as service test packets, and places 122 these packets in the IEEE 802.11 Rx (receive) queue 108. The marking serves to differentiate normal frames from the internally-generated service test frames (in this example for a association test) of the present invention, and to notify the access point that it should ignore these service test frames for operational or communication purposes. In particular, marking can consist of using a special MAC address in source address field of IEEE 802.11 frames. This special address could be an address reserved for use in testing. However, it should be recognized that other types of marking could be used.

The access point then recognizes that there are received packets in its Rx queue 108. Even though these packets were received from the packet emulator instead of normally through the baseband processor 104, the packets in the Rx queue 108 are processed through the normal channel 124 through the LMAC 110 and control/data handler 112, which decapsulates the service test (e.g. probe request) packets from their PHY and MAC layer headers. LMAC 110 and control/data handler 112 are programmed to check for marked packets (e.g. check if the source address is special MAC address). The control/data handler 112 will then process the service test probe request normally to provide an acknowledgement or response, e.g. a probe response.

If the packets being tested include only control or management frames, such as the probe request described herein, the access point will be able to process these frames internally, e.g. send an acknowledgement or probe response. If the packets being tested include data frames, such as a service test that needs a DHCP discover packet, based on the layer 2 headers the access point would need to transmit these packets over a wired or wireless medium (i.e. distribution service) for to a DHCP server external to the access point. In either case, the control/data handler 112 will obtain or provide response packets. The controller/data handler 112 will have special check for the client MAC (field in DHCP header) for the packets received from distribution services such as DHCP offer packet. The controller/data handler 112 will send test response packets with a special client MAC address to the LMAC 110. The destination address will be the special MAC address instead of a broadcast address (DHCP).

The control/data handler 112 then includes the service test marking (i.e. the special MAC address in the Receiver/Destination field) with the acknowledgement and response packets. The control/data handler 112 sends these acknowledgment or probe response packets to the LMAC 110 to add the PHY and MAC layer headers (i.e. encapsulating the probe response packets), as if the acknowledgement or probe response were to be transmitted out though the radio 102. The LMAC 110 delivers 128 the acknowledgement or probe response to the Tx (transmit) queue 106. However, in this case, the access point knows that packets with the service test mark should remain in the Tx queue 106 and not be sent to the baseband processor 104. In particular, the Tx queue 106 is programmed to check if there are any response packets with special MAC address marked in the destination field. The Tx queue 106 will move such a marked response to the Rx queue 108.

Rx queue 108 is programmed to check if there are any service marked response packets (i.e. it can check if there are response packets with the special MAC address in the destination field). RX queue 108 will send an interrupt to the control/data generator and LMAC module 120, for marked packets. In this example, the module 120 will retrieve 126 the service marked packets and delete them from the Rx queue 108. The module 120 will decapsulate the acknowledgment or service test probe response packets from MAC layer headers, and provide these decapsulated packets to the simulator 117, will compare the probe response packets to its table which contains a list of packets that should have been received for a proper probe response. If there is a proper response, then the service test is validated, which can be indicated to the entity that initiated the trigger, such as the managing device 130. The module 120 will always send back the acknowledgement to Rx Queue 106 for all the response packets which will follow the normal path. The packet emulator 116 can then generate the next frame of the service test, if required. The record keeper 118 can keep a record of the emulated packets for validating the response.

However, if there is an improper response, then the simulator 117 can indicate a test failure to the entity that initiated the trigger. Corrective action can include: notifying the managing device 130 (e.g. to show a failure and/or signal an alarm on a terminal display of a network administrator) that the tested service is unavailable at that access point, notifying an entity (e.g. a mobile device) requesting a service that it is not available at that access point, shutting down the access point, conducting an internal test, and attempting to correct the problem.

Figure 2:
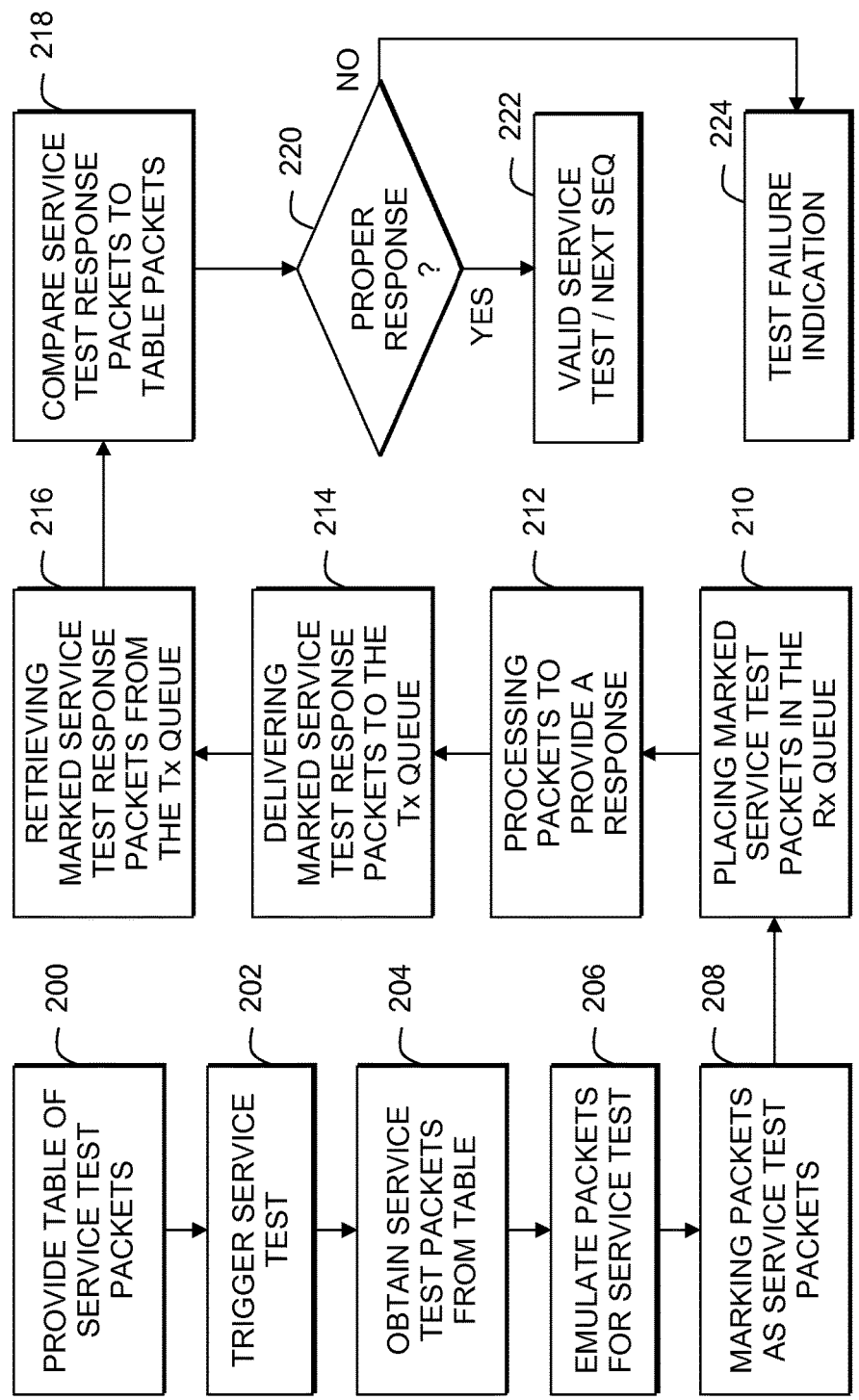
FIG. 2 is a flowchart of a method, in accordance with the present invention.

FIG. 2 illustrates a flowchart of a method for self-testing of services in an access point of a communication network, in accordance with the present invention.

The method starts with a step 200 of providing a table that has a mapping between a service test and a list of packets to be sent for testing that service and a list of packets that should be received in response to the testing.

A next step 202 includes triggering the service test.

A next step 204 includes looking up the service test in the table and obtaining the mapped list of packets to be used in the service test.

A next step 206 includes emulating the packets to be sent for the service test.

A next step 208 includes marking the packets as service test packets. This also includes adding physical (PHY) layer and MAC layer headers to the packets, i.e. encapsulating the packets with proper headers.

A next step 210 includes placing the marked service test packets in an Rx queue of the access point.

A next step 212 includes processing the service test packets normally by the access point to provide response packets. Processing includes decapsulating the service test packets, processing the packets normally in the access point to provide response packets, marking these response packets as service test response packets, and encapsulating the response packets with the service test marking.

A next step 214 includes delivering the marked service test response packets to a Tx queue of the access point, which forwards them to the Rx queue.

A next step 216 includes retrieving the marked service test response packets and deleting them from the Rx queue. This can also include decapsulating the service test response packets from their PHY and MAC layer headers. The access point will recognize that marked packets in the Tx queue are not to be transmitted.

A next step 218 includes comparing the service test response packets to the list of packets from the table that should have been received in the response to the testing.

If there is a proper response 220 (i.e. a match), then a next step 222 includes recording a validated service test, and proceeding to a next test sequence (if any).

If there is an improper response 220 (i.e. no match), then a next step 224 includes sending a test failure indication.

The above comparison testing results can be shown on a terminal display of a managing device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for self-testing of services within an access point of a communication network, the method comprising the steps of:
   providing, within the access point, a table that has a mapping between a service test, a list of packets for testing that service, and a list of packets that should be received in response to the testing;
   emulating, within a packet emulator of the access point, the packets for the service test;
   marking, within the access point, the packets as marked service test packets by using a special Media Access Control address in a source address field of the packets for use in testing;
   placing, by the access point, the marked service test packets in an Rx queue of the access point;
   processing, within the access point, the marked service test packets, even though the marked service test packets are emulated instead of being received through a baseband processor, by the access point to provide response packets, and marking these response packets as service test response packets;
   delivering, by the access point, the marked service test response packets to a Tx queue of the access point, which forwards them to the Rx queue within the access point;
   retrieving, by the access point, the marked service test response packets from the Rx queue;
   comparing, within the access point, the marked service test response packets to the list of packets that should have been received in the response to the testing; and
   showing the comparing step results of the service test on a terminal display of a managing device.

2. The method of claim 1, further comprising the steps of:
   triggering the service test, and
   looking up, within the access point, the service test in the table and obtaining the mapped list of packets to be used in the service test.

3. The method of claim 1, wherein marking also includes encapsulating the packets with added physical (PHY) layer and MAC layer headers.

4. The method of claim 1, wherein processing includes decapsulating the marked service test packets, processing the marked service test packets in the access point to provide response packets, and encapsulating the response packets with the service test marking.

5. The method of claim 1, wherein retrieving includes decapsulating the marked service test response packets.

6. The method of claim 1, further comprising the steps of:
   if in the comparing step the service test response packets are listed in the list of packets that should have been received in the response to the testing, then recording a validated service test, and otherwise indicating a test failure on an external device.

7. An access point operable for self-testing of services for a communication network, comprising:
   a simulator operable within a processor of the access point to:
      provide a table that has a mapping between a service test, a list of packets for testing that service, and a list of packets that should be received in response to the testing;
      compare packets received in response to the service test to the list of packets that should have been received in the response to the testing; and
      notify a managing device with the comparison results of the service test such that the managing device operable to show the comparison results of the service test on a terminal display;
   a packet emulator operable within the processor of the access point to:
      emulate the packets for the service test and mark the packets as marked service test packets; and
      mark the packets by using a special Media Access Control address in a source address field of the packets for use in testing; and
   a control/data generator within the processor of the access point and lightweight Media Access Control (LMAC) module operable to place the marked service test packets in an Rx queue of the access point, which processes the service test packets, even though the service test packets are emulated instead of being received through a baseband processor, to provide response packets that are marked as service test response packets and delivered to the Rx queue of the access point via a Tx queue, the control/data generator and LMAC module further operable to retrieve the marked service test response packets from the Rx queue for delivery to the simulator for comparison.

8. The access point of claim 7, wherein the simulator is further operable to receive a trigger for the service test whereupon the packet emulator looks up the service test in the table and obtains the mapped list of packets to be used in the service test.

9. The access point of claim 7, wherein the control/data generator and LMAC module is further operable to encapsulate the service test packets with added physical (PHY) layer and MAC layer headers and decapsulate the service test response packets.

10. The access point of claim 7, wherein the access point is further operable to decapsulate the marked service test packets from the Rx queue, process the marked service test packets to provide response packets, and encapsulate the response packets with the service test marking.

11. The access point of claim 7, wherein the control/data generator and LMAC module is further operable to decapsulate the marked service test response packets.

12. The access point of claim 7, wherein a record keeper operable within a processor of the access point, in response to the comparison, records a validated service test if the service test response packets are listed in the list of packets that should have been received in the response to the testing, and otherwise indicates a test failure on an external device.

13. The access point of claim 11, wherein the access point provides the results of the comparison for display on a display terminal of a managing device.

14. A system operable for self-testing of services within an access point of a communication network, comprising:

a simulator, operable within a processor of the access point, operable to provide a table that has a mapping between a service test, a list of packets for testing that service, and a list of packets that should be received in response to the testing, and operable to compare packets received in response to the service test to the list of packets that should have been received in the response to the testing;

a packet emulator, operable within the processor of the access point, operable to emulate the packets for the service test and mark the packets as marked service test packets, and operable to mark the packets by using a special Media Access Control address in a source address field of the packets for use in testing;

a control/data generator operable within the processor of the access point and lightweight Media Access Control (LMAC) module, within the access point, operable to place the marked service test packets in an Rx queue of the access point, which processes the service test packets, even though the service test packets are emulated instead of being received through a baseband processor, to provide response packets, marks the response packets as service test response packets, and delivers the marked service test response packets to a Rx queue of the access point via a Tx queue, the control/data generator and LMAC module further operable to retrieve the marked service test response packets from the Rx queue for delivery to the simulator for comparison; and a terminal display of a managing device operable to show the comparison results of the service test.

* * * * *